3,311,575
FOAMING COMPOSITIONS
Neil Bonnette Graham, St. Hilaire, Quebec, Canada, assignor to Canadian Industries Limited, Montreal, Quebec, Canada, a corporation of Canada
No Drawing. Filed Apr. 23, 1963, Ser. No. 274,953
Claims priority, application Great Britain, Nov. 27, 1962, 44,864/62, 44,866/62; Feb. 5, 1963, 4,725/63, 4,727/63
9 Claims. (Cl. 260—2.5)

This invention relates to novel compositions suitable for the production of foamed cellular polymeric materials, novel foaming processes employing such compositions and the novel foamed cellular polymeric materials obtained therefrom.

It is known to manufacture solid foamed polymeric materials by expanding polymeric materials with numerous gas bubbles to yield products having densities as low as one or two pounds per cubic foot. Such polymeric foams are known in both rigid and flexible forms, and typical examples thereof are the polyurethane and polystyrene foams. The former are capable of being foamed-in-place to fill cavities of irregular shape, and they may also be dispensed from mixing machines to coat articles with thick insulating blankets. Their isocyanate ingredients are, however, undesirably toxic under some conditions. The polystyrene foams, on the other hand, are not conveniently foamed-in-place since requiring external heating for this purpose and, in addition, they do not flow easily into complex cavities and do not bond to surfaces.

It is an object of this invention to provide new foaming compositions which are suitable for the production of foamed-in-place polymeric materials and the ingredients of which do not present the toxicity problems encountered with the ingredients of polyurethane foaming compositions. Another object of the invention is to provide new compositions which yield polymeric foams having a wide variety of properties suitable for many end uses. Additional objects of the invention will appear hereinafter.

The new foaming compositions of this invention comprise at least one polymerizable vinyl ether containing at least two vinyl groups per molecule, a vinyl ether-reactive member selected from the group consisting of aliphatic monohydric and polyhydric alcohols, mixtures of phenolic compounds with said alcohols, mixtures of epoxidized materials containing at least one epoxide group per molecule with said alcohols, and acidic compounds containing at least two carboxylic acid groups per molecule, a foaming agent and an acidic catalyst.

Any foaming agent may be used in the compositions, particularly those which have been proposed for use in conjunction with polyurethane materials for the production of foamed or cellular materials. Volatile foaming agents are particularly suitable.

As suitable acidic catalysts, there may be used, in particular, those acidic catalysts which have been proposed for the polymerization of vinyl ethers and, more particularly, those which have been proposed for the polymerization of vinyl ethers having two vinyl groups. Especially useful catalysts are the strong acidic ones.

Preferred foaming compositions according to this invention comprise, in addition to the foaming agent and acidic catalyst, at least one polymerisable vinyl ether containing at least two vinyl groups per molecule in admixture with the following vinyl ether-reactive materials in the proportions indicated:

(a) A compatible aliphatic monohydric or polyhydric alcohol, the proportions of the ingredients being preferably such that the number of vinyl groups provided by said vinyl ether is greater than the number of hydroxyl groups provided by said alcohol;

(b) A compatible aliphatic monohydric or polyhydric alcohol, and a compatible phenolic compound the proportions of the ingredients being preferably such that the number of vinyl groups provided by said vinyl ether is greater than the number of hydroxyl groups provided by said phenolic compound and alcohol;

(c) Compatible aliphatic monohydric or polyhydric alcohol and a compatible epoxidized material containing at least one epoxide group per molecule, the proportions of the ingredients being preferably such that the number of hydroxyl groups provided by said alcohol is not greater than about 75% of the combined number of vinyl groups and epoxide groups provided by said vinyl ether and epoxidized material, respectively; or (d) A compatible acidic compound containing at least two carboxylic acid groups per molecule, the proportions of the ingredients being preferably such that the number of carboxylic acid groups provided by said compound is less than 75% of the number of vinyl groups provided by said vinyl ether.

Under the influence of the catalyst and in the presence of the foaming agent, the polymerizable vinyl ether and the vinyl ether-reactive compound or compounds undergo chemical reaction leading to the formation of polymeric foamed materials of widely varied proportions and utilities.

It has been found that organic bases such as the dimethyl tertiary amines derived from coconut fatty acids can be used to retard the reaction of the foam-forming ingredients of the compositions.

The foaming compositions of this invention may also include materials copolymerizable with the other ingredients thereof, e.g., cyclic anhydrides as well as non-reactive additives which may be flame retardants, surfactants, dyes, fillers, stabilizers, antioxidants, extenders, plasticizers and viscosity-modifiers such as polyvinyl chloride, vinyl acetate/vinyl chloride copolymers and rubbers.

The polymerizable vinyl ethers, suitable for use in the foaming compositions of this invention, are ethers in which at least two vinyl groups are each joined to an ether oxygen atom.

They may have a generic formula such as (1) 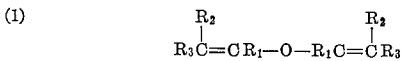

(2) 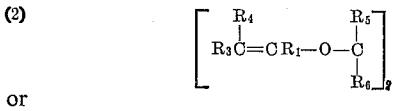

or (3) 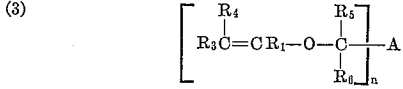

wherein $n$ is an integer having a value of at least 2, $R_1$ and $R_2$ are members selected from the group consisting of hydrogen and alkyl radicals, $R_3$ is a member selected from the group consisting of hydrogen, halogen atoms and hydrocarbyl radicals, $R_4$ and $R_5$ taken together form a member selected from the group consisting of two hydrogen atoms, two alkyl radicals and one alkylene or substituted alkylene radical, $R_6$ is a member selected from the group consisting of hydrogen and alkyl radicals, and $A$ is a linking group having a valence equal to $n$.

Examples of the aforementioned vinyl ethers are: divinyl ether, di-isopropenyl ether, butanediol divinyl ether, propylene oxide/polyol condensates of the formulae

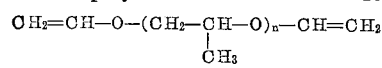

and

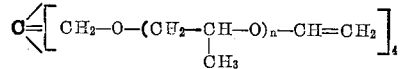

wherein n is any integer, 3,4-dihydro-2H-pyran-2-methyl-(3,4-dihydro-2H-pyran-2-carboxylate) described hereinafter, 1,2 - ethanedioxy-bis-(3',4'-dihydro-2'H-pyran-2'-carbonyl) of the formula

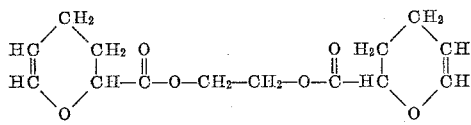

bis-(3,4-dihydro-2H-pyran-2-methyl) succinate of the formula

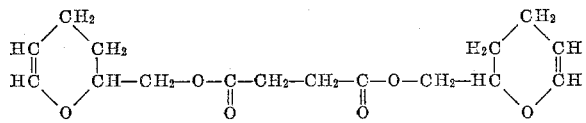

1,2-bis(3',4'-dihydro-2'H-pyran-2'-oxy)ethane of the formula

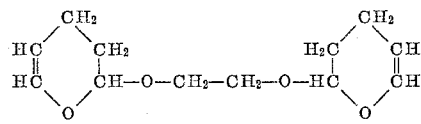

1,1-bis(3',4'-dihydro-2'H-pyran-2'-methoxy)ethane of the formula

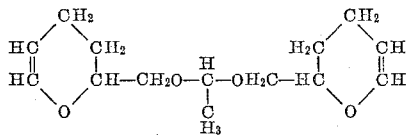

1,2-ethanedioxy-bis(3',4'-dihydro - 5' - methyl-2'H-pyran-2'-carbonyl) of the formula

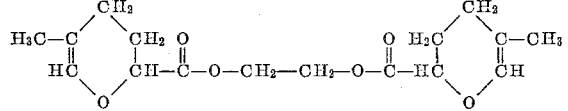

1,2 - bis(3',4'-dihydro-5'-methyl-2'H-pyran-2'-oxy)ethane of the formula

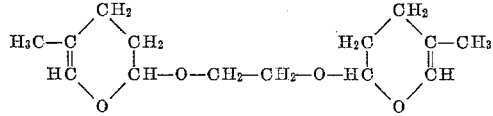

1,1-bis(3',4'-dihydro - 5' - methyl-2'H-pyran-2'-methoxy)ethane of the formula

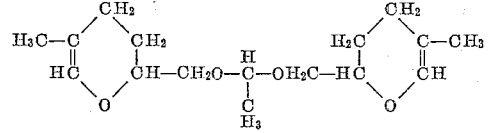

toluene-2,4-bis-(3',4'-dihydro-2'H-pyran-2' - methyl) carbamate of the formula

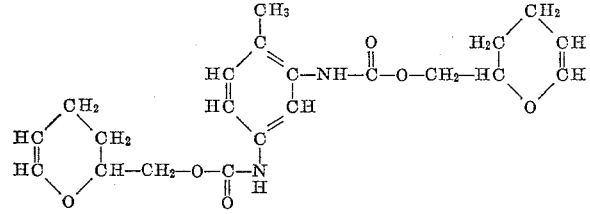

the tri-ester derived from three moles of 2-hydroxymethyl-3,4-dihydro-2H-pyran and one mole of orthophosphoric acid, and the esters derived from 2-hydroxymethyl-3,4-dihydro-2H-pyran and organic polybasic acids such as maleic and adipic acids, it has been found that the straight chain vinyl ethers are more reactive than branched chain or cyclic vinyl ethers. It is desirable that the vinyl ethers do not boil during the foam-forming reaction.

The aliphatic monohydric or polyhydric alcohol ingredients of the foaming compositions of this invention include amyl alcohol, 2-ethylhexyl alcohol, nonyl alcohol, n-decyl alcohol, polypropylene glycol, castor oil, sugar alcohols, alkyl and acyl cellulose derivatives, polyether condensates of polyhydric alcohols and olefin oxides such as the polypropylene oxide condensates of hexahydroxy sugar alcohols and propylene oxide, ethylene glycol, 1,5-pentanediol, glycerol, 1,2,6-hexanetriol and hydroxyl-containing esters and polyesters obtained by condensation of polyhydric alcohols and polybasic acids. The proportions of condensating ingredients in said hydroxyl-containing esters and polyesters may range from one mole of polyol for each carboxylic acid group in the acid to one mole of polycarboxylic acid for each hydroxyl group in the polyol. The first limit gives an ester containing free alcoholic hydroxyl groups whereas the second gives an ester containing carboxylic acid groups; in between these limits, polyesters are formed which contain both hydroxyl and carboxylic acid groups.

The phenolic compounds used as ingredients in the foaming compositions are those aromatic compounds which contain one or more hydroxyl groups in their molecules such as phenol, alkyl-substituted phenols, e.g., cresols, halogen-substituted phenols, e.g., 2,4,5-trichlorophenol, resorcinol, phloroglucinol, catechol, hydroquinone, 2:2-di-p-hydroxy-phenylpropane, low molecular weight phenol-terminated polycarbonates, the condensation products of phenols with aldehydes and ketones, etc.

By "epoxidized materials containing at least one epoxide group per molecule" are meant compounds containing one or more groups of the formula

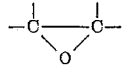

per molecule. Examples of such compounds are epichlorohydrin, styrene oxide, diallyl ether monoxide, cyclohexene oxide, glycidyl phenyl ether, glycidyl stearate, dipentene dioxide, vinyl cyclohexene dioxide, polyallyl glycidyl ether, diphenylolpropane diglycidyl ether, epoxidized polybutadiene, epoxidized styrene-butadiene copolymers, the resinous condensates of epichlorohydrin and aliphatic or aromatic polyols such as glycerol or 2:2-di-p-hydroxyphenyl propane, etc.

Suitable polycarboxylic acid ingredients include succinic, adipic, azelaic, maleic, fumaric, itaconic, phthalic, isophthalic, terephthalic, trimellitic, trimesic, and chlorendic(1,4,5,6,7,7 - hexachlorobicyclo - [2.2.1]-5-heptene-2,3-dicarboxylic acid) acids, and polymerized unsaturated fatty acids such as dimer acids.

Volatile foaming agents suitable for use in the foaming compositions of the invention are those which are soluble or dispersible in the other ingredients of the foaming compositions and are sufficiently volatile that they vaporize during the formation of the foamed polymeric materials. The heat of the catalyzed polymerization reaction causes the foaming agent to boil, and the vapour forms bubbles which expand during the polymerization reaction to give a low density, foamed polymerized mass. Suitable foaming agents are the halogenated hydrocarbons such as trichloromonofluoromethane, dichlorotetrafluoroethane, trichlorotrifluoroethane, dibromodifluoromethane, dichlorohexafluorocyclobutane, methylene chloride, chloroform, trichloroethylene, carbon tetrachloride and perchloroethylene.

The strong acid catalysts suitable for promoting the reaction of the polymer-forming ingredients of the foaming compositions include the strong proton-donating acids, such as p-toluenesulphonic acid, and the Lewis acids such as trimethoxyboroxine and boron trifluoride conveniently employed as the etherate, $BF_3 \cdot (C_2H_5)_2O$. Compositions containing very reactive vinyl ethers such as butanediol divinyl ether can be catalyzed by p-toluenesulphonic acid but a Lewis acid catalyst is preferred for those compositions containing 3,4-dihydro-2H-pyranyl compounds including the 3,4-dihydro-2H-pyran-2-methyl-(3,4-dihydro-2H-pyran-2-carboxylate) referred to hereinafter.

It is possible to control the polymerization reaction by employing catalyst combinations e.g. p-toluene sulphonic acid and boron trifluoride or boron trifluoride and trimethoxyboroxine. Other materials which are suitable as catalytic ingredients are ferric chloride, stannic chloride, phophorus pentachloride, phosphoric acid, perchloric acid, acetic acid, trifluoroacetic acid, trichloroacetic acid, fluoboric acid, boron trifluoride dihydrate, hydrogen fluoride, antimony pentafluoride, hexafluorophosphoric acid, lead fluoborate, antimony fluoborate, sulphuric acid and silicotungstic acid. The solvent in which the catalyst is dissolved also affects the catalyst reactivity, polypropylene glycol solutions of $BF_3.(C_2H_5)_2O$ being less reactive than xylene solutions of said catalyst. Suitable catalytic amounts range from 0.005% to 2.0% by weight of the compositions, but these amounts are not limitative since the amount of catalyst should be adjusted to the temperature of operation and the foam induction period required. When Lewis acids are used as catalysts in foaming compositions devoid of phenolic, alcoholic or carboxylic acid ingredients, it is often advantageous to incorporate into the compositions small amounts of co-catalysts such as water, alcohols or carboxylic acids.

Suitable flame-retardants for incorporation in the foaming compositions include trichloroethylphosphate, 2:2-bis - (3',5' - dibromo - 4'-hydroxyphenyl) propane, chlorendic acid and polyvinyl chloride, with or without antimony oxide. The phenolic compound and the chlorendic acid serve both as flame-retardants and vinyl ether-reactive materials.

The preferred surfactants are those of the silicone type, examples of which are disclosed in Belgian Patents Nos. 582,362 and 584,089, i.e. being of the siloxane oxyalkylene copolymer type.

In the above list of vinyl ether-reactive materials, preferred proportions are indicated. However, the proportions of such reactive materials in relation to proportions of vinyl ethers may vary considerably. The use of widely differing proportions leads to the formation of foamed materials of differing properties, e.g. different compression strength, density and texture. In order to obtain foamed materials of advantageous properties and of particular utility, it is often necessary to vary the proportions of vinyl ether and vinyl ether-reactive material according to the nature of the reactive material used.

Referring, then, to particularly preferred proportions of the ingredients of the foaming compositions of this invention, it has been found that in the case of compositions containing ether-reactive ingredient (a), preferred compositions comprise at least 50% by weight of the vinyl ether, the amount of aliphatic monohydric or polyhydric alcohol being such that the number of hydroxyl groups provided thereby is less than 50% of the number of vinyl groups provided by said vinyl ether, and from 2% to 30% by weight of the foaming agent, the remaining ingredients such as surfactant and flame-retardant being present in amounts less than about 15% by weight.

The incorporation of aliphatic monohydric or polyhydric alcohols into the foaming compositions results in improvements compared to compositions containing vinyl ethers alone. The improvements are an increase in the foam induction period, thus allowing control when the recipes without said alcohol have an undesirably short induction period, production of a tough skin on the foams whereas a weak skin is obtained in the absence of said alcohol, production of foams of finer cell structure and production of less brittle foams than when the recipes contain no alcohol.

Preferred compositions containing ether-reactive material (b) comprise at least 30% by weight of the vinyl ether, the combined weight of the phenolic compound and aliphatic monohydric or polyhydric alcohol being such that the number of hydroxyl groups provided thereby is less than 75% of the number of vinyl groups provided by said vinyl ether, and from 2% to 30% by weight of the foaming agent, the remaining ingredients such as flame-retardant and surfactant each being present in an amount less than about 5% by weight of the compositions.

The incorporation of phenolic ingredients with the alcoholic ingredients of the compositions results in less brittle foams with a tougher skin and a longer induction period.

Compositions containing ether-reactive material (c) preferably comprise the vinyl ether and epoxidized material in such amounts that the combined weight thereof is at least 50% of the weight of the compositions, the amount of the alcohol being such that the number of hydroxyl groups provided thereby is not greater than about 75% of the combined number of vinyl and epoxide groups provided by the vinyl ether and epoxidized material, respectively, and from 2% to 30% by weight of the foaming agent, the remaining ingredients such as surfactant and flame-retardant being present in an amount less than about 15% by weight.

The incorporation of both epoxidized materials containing at least one epoxide group per molecule and aliphatic monohydric or polyhydric alcohols into foaming compositions containing vinyl ethers increase the induction period of the resulting foams, producing resilient foams with a white hard skin and fine cell structure.

Compositions containing ether-reactive material (d) preferably comprise at least 50% by weight of the vinyl ether, the amount of the acidic compound containing at least two carboxylic acid groups per molecule being such that the number of carboxylic acid groups provided thereby is less than 75% of the number of vinyl groups provided by said vinyl ether, and from 2% to 30% by weight of the foaming agent, the remaining ingredients such as surfactant and flame-retardant being present in an amount less than about 15% by weight. The acidic compound may also be replaced by an acid anhydride, e.g. maleic anhydride, phthalic anhydride and dodeciphenyl succinic anhydride, the anhydride being present in an amount of from 10% to 15% by weight of the compositions.

The admixture of acidic compounds containing at least two carboxylic acid groups per molecule with the vinyl ethers provides a means of controlling the rate of formation and time of rise of the foams, giving foams with tough skins and even light texture.

The ingredients of the foaming compositions may simply be mixed by stirring in a vessel and then quickly poured into a mould. They may also be mixed in the space which is to be filled with foam if it is suitably shaped. When such stirred mixing is used, it is highly desirable that a surfactant be added to the compositions in order to give foams of small bubbles. However, a surfactant is not always essential. For example, in certain foam-dispensing machines, the ingredients are mixed under pressure using a foaming agent which is gaseous at the mixing temperature, the pressure being controllably released, and the "frothed" mixture is then dispersed to the point of use. In such "frothing" machine, a surfactant is not essential. However, in ordinary dispensing machines wherein the foaming compositions are dispensed before foaming starts, the use of a surfactant is often desirable. In many recipes, it has been found that reduction of the amount of surfactant to the point where the bubbles just burst as polymerization is complete gives foams of the known "open cell" structure.

The foams of this invention in the flexible form may be used for upholstery, mattresses, etc. In the rigid form they are eminently suited for heat and sound insulating purposes, either in closed cavities or as enveloping blankets.

The invention will be more fully illustrated by the following examples but it is to be understood that its scope is not to be limited to the specific embodiments shown.

A preferred vinyl ether used in the examples is 3,4- dihydro-2H-pyran - 2 - methyl-(3,4-dihydro-2H-pyran-2-carboxylate) of the following formula:

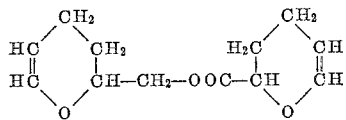

It may be prepared by the self-condensation of acrolein dimer (2-formyl-3,4-dihydro-2H-pyran) in the presence of about 0.3% aluminium isopropoxide, the reaction temperature being held at 45° C. for 6 hours. A purified product may be obtained by flash distillation in a falling film still at 150° C. under vacuum, but satisfactory foams can be obtained with the undistilled product.

EXAMPLE 1

The following two mixtures were prepared.

Mixture A

|  | G. |
|---|---|
| Crude 3,4-dihydro-2H-pyran - 2 - methyl-(3,4-dihydro-2H-pyran-2-carboxylate) | 200 |
| Siloxane oxyalkylene copolymer type silicone surfactant | 5 |
| Trichloromonofluoromethane | 50 |

Mixture B

|  | |
|---|---|
| Polypropylene glycol (M.W. 2025) | 200 |
| Trichloromonofluoromethane | 50 |
| Boron trifluoride (48% as etherate) | 7.5 |
| p-Toluenesulphonic acid (20% in ethyl acetate) | 5 |

Mixture B was added to Mixture A with rapid mechanical stirring. After 10 seconds the mixture was poured into a mould. Foaming commenced after 95 seconds. A light-coloured flexible foam was foamed.

EXAMPLE 2

The following two mixtures were prepared.

Mixture A

|  | G. |
|---|---|
| Crude 3,4-dihydro-2H-pyran - 2 - methyl-(3,4-dihydro-2H-pyran-2-carboxylate) | 150 |
| Polypropylene oxide derivative from a hexahydroxy sugar alcohol and propylene oxide (Niax Hexol LS–490) | 50 |
| Trichloromonofluoromethane | 50 |

Mixture B

|  | |
|---|---|
| Boron trifluoride (10% in diethylene glycol) | 10 |
| p-Toluene sulphonic acid (20% in ethyl acetate) | 10 |

Mixture B was added to Mixture A using mechanical stirring. After 10 seconds the mixture was poured into a mould and after 70 seconds, foaming commenced. A light fawn foam with a tough skin was formed. This foam was semi-rigid but showed little shrinkage in spite of the low compression strength, which indicated an open cell foam. The core density was 2.4 lbs./ft.$^3$. The force needed to produce 10% compression of the foam was 2.9 lbs./in.$^2$ parallel to the direction of rise and 2.6 lbs./in.$^2$ perpendicular to it.

EXAMPLE 3

A styrene/methacrylate/polyol crude 3,4-dihydro-2H-pyran-2-methyl-)3,4-dihydro-2H-pyran - 2 - carboxylate) resin was prepared as follows: 400 g. of polypropylene glycol of molecular weight 425 were placed in a 2 litre three-necked flask equipped with stirrer, reflux condenser, addition funnel and thermometer. The following mixture was then added evenly over a two hour period while the temperature of the polymerization was maintained at 120° C.

|  | G. |
|---|---|
| Styrene | 420 |
| Methacrylic acid | 180 |
| Benzoyl peroxide | 18 |
| Tert. butylhydroperoxide | 6 |

When the addition was completed, the reaction mixture was stirred at 120° C. for a further 5 hours. The temperature was then lowered to 90° C. and so maintained for 14 hours. At this time, the temperature was raised to 110° C. and with slow stirring, 7.5 g. of the dimethyl amine derived from the distilled acids of coconut oil of approximate formula $(CH_3)_2N.C_{12}H_{25}$ ("Armeen" DMCD) were added. Then, 1,2-butylene oxide was run into the mixture through a tube which reached below the surface of the reaction mixture. This method of introduction prevented the butylene oxide from boiling off as the reaction mixture was at a temperature above the boiling point of the butylene oxide. The temperature was maintained at 100° C. for 4 hours, then reduced to 90° C. and the mixture was left at this temperature overnight. The mass was viscous and light brown in colour. Titration of a sample indicated that only 10.5 g. out of the original 180 g. of methacrylic acid remained unesterified. 500 g. of crude 3,4-dihydro-2H-pyran - 2 - methyl-(3,4-dihydro-2H-pyran-2-carboxylate) were then added with stirring.

The following two mixtures were then prepared.

Mixture A

|  | G. |
|---|---|
| Crude 3,4-dihydro-2H-pyran - 2 - methyl-(3,4-dihydro-2H-pyran-2-carboxylate) | 125 |
| Styrene/methacrylate/polyol/3,4 - dihydro-2H-pyran-2-methyl-(3,4-dihydro-2H-pyran - 2 - carboxylate) resin | 75 |
| Siloxane oxyalkylene copolymer type silicone surfactant | 1 |
| Trichloromonofluoromethane | 50 |

Mixture B

|  | |
|---|---|
| Boron trifluoro (10% in diethylene glycol) | 15 |

Mixture B was added to Mixture A using mechanical stirring. After 10 seconds, the mixture was poured into a mould. After 60 seconds, foaming commenced. A dark coloured foam was formed which has a core density of 1.7 lbs./ft.$^3$.

EXAMPLE 4

The following two mixtures were prepared.

Mixture A

|  | G. |
|---|---|
| Crude 2,4-dihydro-2H-pyran-2-methyl(3,4-dihydro-2H-pyran-2-carboxylate) | 150 |
| Siloxane oxyalkylene copolymer type silicone surfactant | 2.5 |

Mixture B

|  | G. |
|---|---|
| The 1,5 - pentanediol diester of phthalic acid $(C_6H_4(COO(CH_2)_5OH)_2)$ | 50 |
| Trichloromonofluorometdane | 50 |
| Boron trifluoride (48% as boron trifluoride etherate) | 2 |

Mixture B was blended with Mixture A using mechanical stirring. After 10 seconds the mixture was poured into a mould. Foaming commenced in 5 minutes. The resulting foam had a tough skin, was dark in colour and had a core density of 1.6 lbs./ft.$^3$. The force required for 10% compression was 7.4 lbs./in.$^2$ both parallel and perpendicular to the direction of rise of the foam.

EXAMPLES 5 TO 15

A series of eleven foams were prepared containing polyproylene glycol of molecular weight 2025 and different vinyl ethers using the following procedure. The vinyl ether, polypropylene glycol, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the period of rise of the foam and the height of the foam after rise were measured. The compositions and characteristics of the resulting foams are shown in Table I.

TABLE I

| Example | Vinyl Ether | Polypropylene Glycol of molecular weight 2025, g. | Siloxane oxyalkylene copolymer type silicon surfactant, g. | Trichloro monofluoromethane, g. | Boron trifluoride, 10% in diethylene glycol, ml. | Induction period, sec. | Rise Period, sec. | Height, in. |
|---|---|---|---|---|---|---|---|---|
| | 3,4-dihydro-2H-pyran-2-methyl (3,4-dihydro-2H-pyran-2-car-boxylate): | | | | | | | |
| 5 | 20 g | 10 | 0.5 | 5 | 1.5 | 250 | 40 | 9.25 |
| 6 | 20 g | 10 | 0.5 | 5 | 2.2 | 120 | 20 | 9.75 |
| 7 | 20 g | 7 | 0.5 | 5 | 2.2 | 90 | 20 | 12 |
| | Bis-(3,4-dihydro-2H-pyran-2-methyl) adipate: | | | | | | | |
| 8 | 20 g | 7 | 0.5 | 5 | 2.5 | 50 | 10 | 6.5 |
| 9 | 20 g | 7 | 0.5 | 5 | 2.2 | 65 | 10 | 6.5 |
| 10 | Bis-(3,4-dihydro-2H-pyran-2-methyl) succinate, 20 g | 7 | 0.5 | 5 | 2.2 | 75 | 20 | 10.25 |
| | Bis-(3,4-dihydro-2H-pyran-2-methyl) azelate: | | | | | | | |
| 11 | 20 g | 7 | 0.5 | 5 | 2.2 | 110 | 20 | 5.25 |
| 12 | 20 g | 7 | 0.5 | 5 | 2.5 | 95 | 20 | 6.75 |
| 13 | Bis-(3,4-dihydro-2H-pyran-2-methyl) sebacate, 20 g | 7 | 0.5 | 5 | 2.5 | 120 | 10 | 5.25 |
| 14 | Bis-(3,4-dihydro-2H-pyran-2-methyl) phthalate, 20 g | 7 | 0.5 | 5 | 2.5 | 45 | 20 | 8 |
| 15 | Bis-(3,4-dihydro-2H-pyran-2-methyl) fumarate, 10 g | 3 | 0.5 | 5 | 1.0 | 60 | 7 | 4.5 |

EXAMPLE 16

10 g. of 2-(2-formyl-3,4-dihydro-1,2-pyranyl)-2-(3,4-dihydro-1,2-pyranyl) carbinol were mixed with 2 g. of polypropoxylated pentaerythritol ("Pluracol" PeP 450) and 0.1 g. of siloxane oxyalkylene copolymer type silicone surfactant using a high speed stirrer. After 2 minutes of stirring 2 g. of trichloromonofluoromethane and 0.1 g. of a solution containing 10% by weight of fluoboric acid in diethylene glycol were added. The mixture was poured into a mould where it foamed to form a white friable foam.

EXAMPLE 17

10 g. of 2-(2-formyl-3,4-dihydro-1,2-pyranyl)-2-(3,4-dihydro-1,2-pyranyl) carbinol were mixed with 2 g. of polypropoxylated pentaerythritol ("Pluracol" PeP 650) and 0.1 g. of siloxane oxyalkylene copolymer type silicone surfactant using a high speed stirrer. After 2 minutes of stirring 2 g. of trichloromonofluoromethane and 0.2 g. of a solution prepared by diluting 48%–50% by weight of fluoboric acid in water with diethylene glycol to a concentration of 10% by weight of fluoboric acid were added. The mixture was poured into a mould and foamed after an induction period of 2 minutes to form a slightly discoloured brittle foam with a coarse, hard skin.

EXAMPLE 18

The following mixtures were prepared.

*Mixture A*

| | G. |
|---|---|
| Distilled 3-4-dihydro-2H-pyran-2-methyl-(3,4-dihydro-2H-pyran-2-carboxylate) | 170 |
| 2:2-di-p-hydroxyphenylpropane | 30 |
| Trichloromonofluoromethane | 50 |
| Polypropylene glycol molecular weight 2025 | 30 |
| Siloxane oxyalkylene copolymer type silicone surfactant | 2 |

*Mixture B*

Boron trifluoride 10% in diethylene glycol _____ 2.5

Mixture B was added to Mixture A while mixing with a high speed stirrer. After 10 seconds, the mixture was poured into a mould and foamed after 40 seconds to give a light brown rigid foam of 2.2 lbs./cu. ft. core density. Force needed for 10% compression was 13.3 lbs./in.$^2$ parallel to the direction of rise and 9.5 lbs./in.$^2$ perpendicular to it.

EXAMPLES 19 to 22

The foaming compositions below were prepared and foamed as in Example 99, the foaming agent and catalyst comprising Mixture B. Table II describes the foaming compositions and the resulting foams.

TABLE II

| Ex. | Distilled 3,4-dihydro-2H-pyran-2-methyl-(3,4-dihydro-2H-pyran-2-carboxylate), grams | 2:2-di-p-hydroxyphenyl-propane, grams | Polypropylene glycol M.W. 2025, grams | Siloxane oxyalkylene copolymer type silicone surfactant, grams | Trichloromonofluoromethane, grams | Boron trifluoride, 10% in diethylene gycol, grams | Induction period, min. | Density, lbs./ft.$^3$ | Force required for 10% compression, pounds per square inch | |
|---|---|---|---|---|---|---|---|---|---|---|
| | | | | | | | | | Parallel to direction of rise | Perpendicular to direction of rise |
| 19 | 150 | 50 | 50 | 2 | 50 | 2.5 | 8 | 3.6 | 13.8 | 8.0 |
| 20 | 180 | 50 | 20 | 2 | 50 | 2.5 | 3 | 2.3 | 23 | 12 |
| 21 | 180 | 60 | 20 | 2 | 50 | 2.5 | 1½ | 2.2 | 24 | 12 |
| 22 | 150 | 60 | 50 | 2 | 50 | 2.5 | 2 | 2.1 | 21 | 9 |

EXAMPLE 23

The following two mixtures were prepared.

*Mixture A*

| | G. |
|---|---|
| Distilled 3,4-dihydro-2H-pyran-2-methyl-(3,4-dihydro-2H-pyran-2-carboxylate) | 200 |
| 2:2-di-p-hydroxyphenyl propane | 100 |
| Polypropylene glycol molecular weight 2025 | 200 |

Mixture B

| | G. |
|---|---|
| Trichloromonofluoromethane | 100 |
| Boron trifluoride (48% as the etherate) | 7.5 |
| p-Toluenesulphonic acid 20% in ethyl acetate | 5.05 |

Mixture B was added to Mixture A while mixing with a high speed stirrer. After 10 seconds the mixture was poured into a mould and foamed after 6 seconds to give an open cell flexible foam.

EXAMPLE 24

The following two mixtures were prepared.

Mixture A

| | G. |
|---|---|
| Crude 3,4-dihydro-2H-pyran-2-methyl-(3,4-dihydro-2H-pyran-2-carboxylate) | 150 |
| Novolak resin | 25 |
| Polypropylene oxide derivative from a hexahydroxy sugar alcohol and propylene oxide ("Niax Hexol" LS-490) | 50 |
| Siloxane oxyalkylene copolymer type silicone surfactant | 2.5 |
| Trichloromonofluoromethane | 50 |

Mixture B

| | G. |
|---|---|
| Boron trifluoride 10% in diethylene glycol | 10 |
| p-Toluenesulphonic acid 20% in ethyl acetate | 10 |

Mixture B was added to Mixture A while mixing with a high speed stirrer. After 10 seconds the mixture was poured into a mould and foamed after an induction period of 31 seconds to form an open cell flexible foam.

EXAMPLE 25

A styrene/methacrylate/polyol/crude 3,4-dihydro-2H-pyran-2-methyl-(3,4-dihydro-2H-pyran-2-carboxylate) resin was prepared as follows. 400 g. of polypropylene glycol of molecular weight 425 were placed in a 2 litre three-necked flask equipped with stirrer, reflux condenser, addition funnel and thermometer. The following mixture was then added evenly over a two hour period while the temperature of the polymerization was maintained at 120° C.

| | G. |
|---|---|
| Styrene | 420 |
| Methacrylic acid | 180 |
| Benzoyl peroxide | 18 |
| Tert. butylhydroperoxide | 6 |

When the addition was completed, the reaction mixture was stirred at 120° C. for a further 5 hours. The temperature was then lowered to 90° C. and so maintained for 14 hours. At this time, the temperature was raised to 110° C. and with slow stirring, 7.5 g. of the dimethyl amine derived from the distilled acids of coconut oil of approximate formula $(CH_3)_2NC_{12}H_{25}$ ("Armeen" DMCD) were added. Then, 1,2-butylene oxide was run into the mixture through a tube which reached below the surface of the reaction mixture. This method of introduction prevented the butylene oxide from boiling off as the reaction mixture was at a temperature above the boiling point of the butylene oxide. The temperature was maintained at 100° C. for 4 hours, then reduced to 90° C. and the mixture was left at this temperature overnight. The mass was viscous and light brown in colour. Titration of a sample indicated that only 10.5 g. of the original 180 g. methacrylic acid remained unesterified. 500 g. of crude 3,4-dihydro-2H-pyran-2-methyl-(3,4-dihydro-2H-pyran-2-carboxylate) were then added with stirring.

The following two mixtures were prepared

Mixture A

| | G. |
|---|---|
| Crude 3,4 - dihydro - 2H - pyran - 2 - methyl - (3,4-dihydro - 2H - pyran - 2 - carboxylate) | 150 |
| 2:2 - bis(3',5' - dibromo - 4' - hydroxyphenyl) propane | 25 |
| Styrene/methacrylate/polyol/3,4 - dihydro - 2H - pyran - 2 - methyl - (3,4 - dihydro - 2H - pyran - 2-carboxylate) resin | 75 |
| trichloromonofluoromethane | 50 |
| Siloxane oxyalkylene copolymer type silicone surfactant | 1 |

Mixture B

| | G. |
|---|---|
| Boron trifluoride 10% in diethylene glycol | 15 |

Mixture B was added to Mixture A while mixing with a high speed stirrer. After 10 seconds the mixture was poured into a mould and foaming commenced after 3½ minutes to yield a semi-rigid open cell foam.

EXAMPLES 26 TO 32

A series of seven foams were prepared containing 2:2-di-p-hydroxyphenyl propane, polypropylene glycol of molecular weight 2025 and different vinyl ethers using the following procedure. The vinyl ether, 2:2-di-p-hydroxyphenyl propane, polypropylene glycol, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the period of rise of the foam and the height of the foam after rise were measured. The compositions and characteristics of the resulting foams are shown in Table III.

TABLE III

| Ex. | Vinyl Ether | 2:2-di-p-hydroxyphenyl-propane, g. | Poly propylene glycol of molecular weight 2025, g. | Siloxane oxyalkylene copolymer type silicone surfactant, g. | Trichloromonofluoromethane, g. | Boron trifluoride, 10% in diethylene glycol, ml. | Induction period, secs. | Rise period, secs. | Height, inches |
|---|---|---|---|---|---|---|---|---|---|
| 26 | 3,4-dihydro-2H-pyran-2-methyl-(3,4-dihydro-2-carboxylate): 20 g. | 5 | 7 | 0.5 | 5 | 1.0 | 90 | 45 | 10.5 |
| 27 | 20 g. | 5 | 10 | 0.5 | 5 | 1.2 | 115 | 60 | 9.75 |
| 28 | Bis-(3,4-dihydro-2H-pyran-2-methyl) adipate, 20 g. | 5 | 10 | 0.5 | 5 | 1.5 | 130 | 30 | 5.5 |
| 29 | Bis-(3,4-dihydro-2H-pyran-2-methyl) succinate, 20 g. | 5 | 7 | 0.5 | 5 | 2.0 | 80 | 30 | 6.5 |
| 30 | Bis-(3,4-dihydro-2H-pyran-2-methyl) azelate, 20 g. | 5 | 7 | 0.5 | 5 | 2.0 | 120 | 30 | 3.5 |
| 31 | Bis-(3,4-dihydro-2H-pyran-2-methyl) sebacate, 20 g. | 5 | 7 | 0.5 | 5 | 2.5 | 110 | 30 | 3 |
| 32 | Bis-(3,4-dihydro-2H-pyran-2-methyl) phthalate, 20 g. | 5 | 7 | 0.5 | 5 | 3.0 | 25 | 30 | 6 |

EXAMPLE 33

The following ingredients were heated to 60° C. with stirring.

| | G. |
|---|---|
| Crude 3,4-dihydro - 2H - pyran - 2 - methyl - (3,4-dihydro-2H-pyran-2-carboxylate) | 280 |
| Low molecular weight resinous condensate of epichlorohydrin and 2:2-di-p-hydroxyphenyl propane | 80 |
| Diglyceryl phthalate | 40 |
| Siloxane oxyalkylene copolymer type silicone surfactant | 2 |

The composition was then cooled to room temperature, mixed with 50 g. of trichloromonofluoromethane and then with 5 ml. of a solution of boron trifluoride (as the etherate) in diethylene glycol containing 20% by weight of boron trifluoride. After an induction period of 35 seconds the composition foamed to produce a foam that was white, resilient, with a hard skin, good structure and even surface. The foam rose to a height of 11 inches.

EXAMPLE 34

The following ingredients

| | G. |
|---|---|
| Crude 3,4 - dihydro - 2H - pyran - 2 -methyl - (3,4-dihydro-2H-pyran-2-carboxylate) | 14 |
| Low molecular weight resinous condensate of epichlorohydrin and 2:2-di-p-hydroxyphenyl propane | 4 |
| Tris-(hydroxyethyl)-trimellitate | 2 |
| Siloxane oxyalkylene copolymer type silicone surfactant | 0.2 | were mixed with a high speed stirrer for 1 minute and then 2 g. of trichloromonofluoromethane were added. After stirring for an additional 30 seconds 0.5 ml. of a solution containing 20% by weight of boron trifluoride in diethylene glycol was added. The composition was stirred for an additional 30 seconds and poured into a mould. After an induction period of 65 seconds the composition foamed to form a white foam with hard skin and light brown interior of fine texture. The foam rose 8.5 inches.

EXAMPLE 35

The following ingredients

| | G. |
|---|---|
| Crude 3,4 - dihydro - 2H - pyran - 2 - methyl - (3,4-dihydro-2H-pyran-2-carboxylate) | 14 |
| Low molecular weight resinous condensate of epichlorohydrin and 2:2-di-p-hydroxyphenyl propane | 4 |
| Polypropoxylated pentaerythritol ("Pluracol" PeP 450) | 2 |
| Siloxane oxyalkylene copolymer type silicone surfactant | 0.2 | were mixed with a high speed stirrer for 1 minute and then 2 g. of trichloromonofluoromethane were added. After stirring for an additional 30 seconds 0.3 ml. of a solution containing 20% by weight of boron trifluoride in diethylene glycol was added. The composition was stirred for an additional 30 seconds and poured into a mould. After an induction period of 10 minutes the composition foamed to form a foam with a tough and uneven skin.

EXAMPLE 36

The following ingredients

| | G. |
|---|---|
| Crude 3,4 - dihydro - 2H - pyran - 2 - methyl - (3,4-dihydro-2H-pyran-2-carboxylate) | 14 |
| Low molecular weight resinous condensate of epichlorohydrin and 2:2-di-p-hydroxyphenyl propane | 4 |
| Propoxylated phenol-aldehyde condensate of molecular weight 440 ("Niax Triol" LK-380) | 2 |
| Siloxane oxyalkylene copolymer type silicone surfactant | 0.2 | were mixed with a high speed stirrer for 1 minute and then 2 g. of trichloromonofluoromethane were added. After stirring for an additional 30 seconds 0.5 ml. of a solution containing 20% by weight of boron trifluoride in diethylene glycol was added. The composition was stirred for an additional 30 seconds and poured into a mould. After an induction period of 25 seconds the composition foamed to form a white foam which was semi-porous, of fine structure and discoloured at the centre of the block. The foam rose 10.5 inches.

EXAMPLE 37

The following ingredients

| | G. |
|---|---|
| Crude 3,4 - dihydro-2H-pyran-2-methyl-(3,4-dihydro-2H-pyran-2-carboxylate) | 14 |
| Epoxy novolak resin ("D.E.N." 438) | 4 |
| Diglyceryl phthalate | 2 |
| Siloxane oxyalkylene copolymer type silicone surfactant | 0.2 | were stirred with a high speed stirrer for 1 minute and then 2 g. of trichloromonofluoromethane were added. After stirring for an additional 30 seconds 0.3 ml. of a solution containing 20% by weight of boron trifluoride in diethylene glycol was added. The composition was stirred for an additional 30 seconds and poured into a mould. After an induction period of 20 seconds the composition foamed to form a coarse foam with a tough skin. There was some shrinkage on standing. The foam rose 5½ inches. Similar foams were prepared with the above composition but substituting tris-(hydroxyethyl)-trimellitate or "Niax Triol" LK 380 or "Pluracol" PeP 450 for the diglyceryl phthalate.

EXAMPLE 38

The following ingredients

| | G. |
|---|---|
| Crude 3,4 - dihydro-2H-pyran-2-methyl-(3,4-dihydro-2H-pyran-2-carboxylate) | 14 |
| Low molecular weight resinous condensate of epichlorohydrin and 2:2-di-p-hydroxyphenyl propane | 4 |
| Propoxylated phenol-aldehyde condensate ("Niax Triol" LG–56–one) | 2 |
| Siloxane oxyalkylene copolymer type silicone surfactant | 0.2 | were mixed with a high speed stirrer for 1 minute and then 2 g. of trichloromonofluoromethane were added. After stirring for an additional 30 seconds 0.3 ml. of a solution containing 20% by weight of boron trifluoride in diethylene glycol was added. The composition was stirred for an additional 30 seconds and poured into a mould. After an induction period of 60 seconds the composition foamed to form a white foam with hard skin and light brown interior of fine texture.

EXAMPLE 39

The following ingredients

| | G. |
|---|---|
| Crude 3,4 - dihydro-2H-pyran-2-methyl-(3,4-dihydro-2H-pyran-2-carboxylate) | 14 |
| Low molecular weight resinous condensate of epichlorohydrin and 2:2-di-p-hydroxyphenyl propane | 4 |
| Pentol of molecular weight 393 ("Niox Pentol" LA–700) | 2 |
| Siloxane oxyalkylene copolymer type silicone surfactant | 0.2 | were mixed with a high speed stirrer for 1 minute and then 2 g. of trichloromonofluoromethane were added. After stirring for an additional 30 seconds 0.3 ml. of a solution containing 20% by weight of boron trifluoride in diethylene glycol was added. The composition was stirred for an additional 30 seconds and poured into a mould. The foam produced was brown, resilient and dense with a hard skin. The foam rose 6.5 inches.

EXAMPLE 40

The following foaming composition was prepared.

| | |
|---|---|
| Tetravinyl ether of polypropoxylated pentaerythritol g | 11 |
| Low molecular weight resinous condensate of epichlorohydrin and 2:2 - di - p - hydroxyphenyl propane g | 11 |
| Polypropylene glycol of molecular weight 425 g | 2 |
| Trichloromonofluoromethane g | .10 |

Siloxane oxyalkylene copolymer type silicone surfactant _____ g__ 0.1
Boron trifluoride, 10% in diethylene glycol ____ ml__ 0.2

The first five ingredients were mixed together for 10 seconds and then the boron trifluoride catalyst was added with additional stirring. The compositions foamed to form a flexible foam.

EXAMPLE 41

10 g. of 2-(2-formyl-3,4-dihydro-1,2-pyranyl)-2-(3,4-dihydro-1,2-pyranyl) carbinol were mixed with 2 g. of polypropoxylated pentaerythritol ("Pluracol" PeP 450), 1 g. of epoxy novolak resin (D.E.N. 438) and 0.1 g. of siloxane oxyalkylene copolymer type silicone surfactant using a high speed stirrer. After 2 minutes of stirring 2 g. of trichloromonofluoromethane and 0.1 g. of a solution containing 10% by weight of fluoboric acid in diethylene glycol were added. The mixture was poured into a mould where it foamed to form a white friable foam.

EXAMPLES 52 TO 58

A series of seven foams were prepared containing 3,4-dihydro-2H-pyran-2-methyl-(3,4-dihydro-2H-pyran-2-carboxylate) and different dicarboxylic acids. Some of the foams contained as additional reactive ingredients an alpha, beta-monoethylenically unsaturated compound or a phenol or an epoxidized material. The vinyl ether, the dicarboxylic acid and, when employed, the alpha, beta-monoethylenically unsaturated compound or phenol or epoxidized material, the siloxane oxyalkylene copolymer type silicone surfactant and the trichloromonofluoromethane foaming agent were mixed together. The boron trifluoride catalyst and if employed, the p-toluene-sulphonic acid catalyst were added and stirring continued for a further 10 seconds. The composition was then poured into a mould. The compositions and characteristics of the resulting foams are shown in Table V. The carboxylic acid ingredient controls the rate of the reaction and the rise of the foam.

The resulting foams have tough skins and are of even light texture.

TABLE V

| Ex. | 3,4-dihydro 2H-pyran-2-methyl-(3,4-dihydro-2H-pyran-2-carboxylate), g. | Dicarboxylic acid | Additive | Siloxane oxyalkylene copolymer type silicone surfactant, g. | Trichloromonofluoromethane, g. | p-Toluene sulphonic acid 10% in ethyl acetate, g. | Boron trifluoride 10% in polypropylene glycol MW 2025, g. | Induction period, sec. | Density, lbs./cu.ft. |
|---|---|---|---|---|---|---|---|---|---|
| 52 | 20 | Sebacic Acid, 2.5 | | 0.1 | 5 | 0.05 | 0.6 | 23 | 2.1 |
| 53 | 20 | Phthalic Acid, 2.5 | | 0.1 | 5 | | 0.6 | 22 | 1.7 |
| 54 | 200 | Chlorendic Acid, 25 g. | | 1 | 50 | | 5 | 85 | 2.3 |
| 55 | 200 | Chlorendic Acid, 12.5 g. | 2:2-di-p-hydroxy phenyl propane, 35 g. | 1 | 50 | | 5.5 | 41 | 1.9 |
| 56 | 20 | Chlorendic Acid, 2.5 g. | Dibutyl maleate, 2.5 g. | 0.1 | 5 | | 0.6 | 140 | 2.5 |
| 57 | 20 | Sebacic Acid, 2.5 g. | Vinyl stearate, 2.5 g. | 0.1 | 5.5 | 0.05 | 0.6 | 32 | 2.1 |
| 58 | 20 | Phthalic Acid, 2.5 g. | Epoxidised polyolefin (Oxiron 2000), 1 g. | 0.1 | 5 | | 0.6 | 20 | 1.6 |

EXAMPLES 42 TO 51

A series of 10 foams were prepared containing the dicarboxylic acid formed by the dimerizing of unsaturated fatty acids containing 18 carbon atoms in the molecule ("Empol" 1014) and different vinyl ethers using the following procedure. The vinyl ether, the dicarboxylic acid, the siloxane oxyalkylene copolymer type silicone surfactant and the trichloromonofluoromethane foaming agent were mixed together. The boron trifluoride catalyst was then added and the mixture was poured into a 250 ml. paper cup and stirred for 10 to 15 seconds. The induction period, the period of rise of the foam and the height of the foam after rise were measured. The compositions and characteristics of the resulting foams are shown in Table IV.

EXAMPLE 59

10 g. of 2-(2-formyl-3,4-dihydro-1,2-pyranyl-2-(3,4-dihydro-1,2-pyranyl)carbinol were mixed with 5 g. of the dicarboxylic acid formed by the dimerization of unsaturated fatty acids containing 18 carbon atoms in the molecule (Empol 1014) and 0.1 g. of siloxane oxyalkylene copolymer type silicone surfactant using a high speed stirrer. After 2 minutes of stirring 2 g. of trichloromonofluoromethane and 0.1 g. of a solution containing 10% by weight of fluoboric acid in diethylene glycol were added. The mixture was poured into a mould where it foamed to form a white friable foam.

What we claim is:

1. A foamed cellular polymeric material which is the reaction product of a foamable composition comprising

TABLE IV

| Example | Vinyl Ether | Dicarboxylic acid derived from C-18 fatty acids, g. | Siloxane oxyalkylene copolymer type silicone surfactant, g. | Trichloromonofluoromethane, g. | Boron trifluoride 10% in diethylene glycol, ml. | Induction period, sec. | Rise period, sec. | Height, in. |
|---|---|---|---|---|---|---|---|---|
| | 3,4-dihydro-2H-pyran-2-methyl-(3,4-dihydro-2H-pyran-2-carboxylate): | | | | | | | |
| 42 | 20 g. | 1 | 0.5 | 5 | 0.5 | 120 | 10 | 6.25 |
| 43 | 20 g. | 3 | 0.5 | 5 | 2.0 | 90 | 15 | 10 |
| 44 | 20 g. | 5 | 0.5 | 5 | 2.5 | 70 | 15 | 11.5 |
| 45 | 20 g. | 7 | 0.5 | 5 | 2.5 | 65 | 15 | 11 |
| 46 | 20 g. | 10 | 0.5 | 5 | 2.5 | 70 | 15 | 11 |
| 47 | 20 g. | 20 | 0.5 | 5 | 3.0 | 60 | 25 | 9 |
| 48 | 20 g. | 30 | 0.5 | 5 | 3.0 | 60 | 20 | 4.5 |
| 49 | Bis-(3,4-dihydro-2H-pyran-2-methyl) adipate, 20 g. | 10 | 0.5 | 5 | 2.5 | 35 | 10 | 5.25 |
| 50 | Bis-(3,4-dihydro-2H-pyran-2-methyl) azelate, 20 g. | 10 | 0.5 | 5 | 2.5 | 100 | 20 | 6.75 |
| 51 | Bis-(3,4-dihydro-2H-pyran-2-methyl) sebacate, 20 g. | 10 | 0.5 | 5 | 2.5 | 130 | 25 | 6 |

(A) at least one polymerizable cyclic vinyl ether of the generic formula

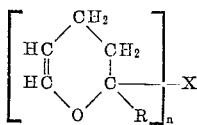

wherein $n$ is an integer having a value of at least two, R is a member selected from the group consisting of the hydrogen atom and the carboxaldehyde radical, and X is a linking group having a valence equal to $n$;
(B) a material reactive with the ethylenic double bonds of said vinyl ether and selected from the group consisting of
  (BB) compatible aliphatic monohydric and polyhydric alcoholic compounds;
  (BC) mixtures of (BB) with compatible phenolic compounds;
  (BD) mixtures of (BB) with compatible epoxidized materials containing at least one epoxide group per molecule; and
  (BE) compatible polycarboxylic acids;
(C) an acidic catalyst capable of promoting the polymerizing reaction between (A) and (B) and selected from the group consisting of strong proton-donating acids and Lewis acids; and
(D) a foaming agent vaporizing at the temperature of reaction of (A) with (B).

2. A foamed cellular polymeric material as claimed in claim 1 wherein the proportions of the ingredients of the foamable composition are such that:
  (BB) the number of hydroxyl groups provided by the alcoholic compound is less than the number of —HC=CH— groups provided by the vinyl ether;
  (BC) the combined number of hydroxyl groups provided by the alcoholic and phenolic compounds, respectively, is less than the number of —HC=CH— groups provided by the vinyl ether;
  (BD) the number of hydroxyl groups provided by the alcoholic compound is not greater than about 75% of the combined number of —HC=CH— and epoxide groups provided by the vinyl ether and epoxidized material, respectively; and
  (BE) the number of carboxylic acid groups provided by the polycarboxylic acid is less than 75% of the number of —HC=CH— groups provided by the vinyl ether.

3. A foamed cellular polymeric material as claimed in claim 1 wherein the foamable composition comprises 3,4-dihydro-2H-pyran-2-methyl-(3,4-dihydro-2H-pyran-2-carboxylate) as a vinyl ether ingredient.

4. A foamed cellular polymeric material as claimed in claim 2 wherein the foamable composition comprises 3,4-dihydro-2H-pyran-2-methyl-(3,4-dihydro-2H-pyran-2-carboxylate) as a vinyl ether ingredient.

5. A foamed cellular polymeric material as claimed in claim 1 wherein the foamable composition comprises bis-(3,4-dihydro-2H-pyran-2-methyl) phthalate as a vinyl ether ingredient.

6. A foamed cellular polymeric material as claimed in claim 1 wherein the acidic catalyst of the foamable composition is at least one member selected from the group consisting of boron trifluoride and boron trifluoride etherate.

7. A foamed cellular polymeric material as claimed in claim 1 wherein the foaming agent of the foamable composition is a fluorochlorocarbon.

8. A process which comprises mixing
(A) at least one polymerizable cyclic vinyl ether of the generic formula

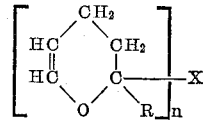

wherein $n$ is an integer having a valve of at least two, R is a member selected from the group consisting of the hydrogen atom and the carboxaldehyde radical, and X is a linking group having a valence equal to $n$;
(B) a material reactive with the ethylenic double bonds of said vinyl ether and selected from the group consisting of
  (BB) compatible aliphatic monohydric and polyhydric alcoholic compounds;
  (BC) mixtures of (BB) with compatible phenolic compounds;
  (BD) mixtures of (BB) with compatible epoxidized materials containing at least one epoxide group per molecule; and
  (BE) compatible polycarboxylic acids;
(C) an acidic catalyst capable of promoting the polymerizing reaction between (A) and (B) and selected from the group consisting of strong proton-donating acids and Lewis acids; and
(D) a foaming agent vaporizing at the temperature of reaction of (A) with (B),
and allowing the mixture naturally to self-expand into a foamed cellular polymeric material.

9. A process as claimed in claim 8 wherein the proportions of the ingredients of the expandable mixture are such that:
  (BB) the number of hydroxyl groups provided by the alcoholic compound is less than the number of —HC=CH— groups provided by the vinyl ether;
  (BC) the combined number of hydroxy groups provided by the alcoholic and phenolic compounds, respectively, is less than the number of —HC=CH— groups provided by the vinyl ether;
  (BD) the number of hydroxyl groups provided by the alcoholic compound is not greater than about 75% of the combined number of —HC=CH— and epoxide groups provided by the vinyl ether and epoxidized material, respectively; and
  (BE) the number of carboxylic acid groups provided by the polycarboxylic acid is less than 75% of the number of —HC=CH— groups provided by the vinyl ether.

References Cited by the Examiner

UNITED STATES PATENTS

| 2,998,415 | 8/1961 | Geiser | 260—91.1 |
| 3,051,665 | 8/1962 | Wismer | 260—2.5 |
| 3,128,258 | 4/1964 | Doedens et al. | 260—2.5 |
| 3,232,892 | 2/1966 | Fisher | 260—2.5 |

MURRAY TILLMAN, *Primary Examiner.*

M. FOELAK, *Assistant Examiner.*